United States Patent Office

2,957,839
Patented Oct. 25, 1960

2,957,839

COMPOSITION CONTAINING WATER SOLUBLE SUBSTITUTED SILANE AND ZIRCONIUM OXYCHLORIDE AND METHOD OF TREATING MATERIAL THEREWITH

Gordon C. Johnson, Hollis, and Maurice H. Jellinek, Williamsville, N.Y., assignors to Union Carbide Corporation, a corporation of New York No Drawing. Filed Jan. 18, 1956, Ser. No. 559,769

21 Claims. (Cl. 260—29.2)

It has been proposed to use various metallic compounds such as the metallic salts of fatty acids as curing catalysts for silicone resins. However, for some applications organo-metallic compounds such as these are unsuitable inasmuch as they are ineffective at the ambient or common temperatures such as room temperatures and require heating to make them effective. For certain applications such as the use of silicones to impart water repellency to various substrates which cannot be heated due to their bulk or the thermal instability of the substrate it is necessary to have a curing catalyst for silicone water repellents which is effective at ordinary (e.g. room) temperatures. Examples of such substrates are found in masonry, paper and textiles.

We have now discovered that water soluble zirconium oxychloride, provides a curing catalyst which when admixed with silicone water repellents gives rapid effective cures imparting a high degree of water repellency to the surfaces to which the zirconium oxychloride catalyzed water repellent is applied and which requires no heating or elevated temperatures for its catalytic action. We have successfully used our zirconium oxychloride catalyzed water repellents on masonry, dry mortar, paper, and textiles.

Not all forms of zirconium oxychloride are water soluble. The completely dehydrated form, $ZrOCl_2$ is largely insoluble in water whereas the completely hydrated form, zirconium oxychloride octahydrate is soluble and zirconium oxychloride in the intermediate states of hydration exhibits varying degrees of water solubility. Any water soluble form of zirconium oxychloride may be employed in the practice of our invention; however, we prefer to use zirconium oxychloride octahydrate. Zirconium oxychloride octahydrate may be employed as a catalyst for water soluble silanes or with water soluble silicones and water emulsions of water insoluble siloxanes when they are used as silicone water repellents. It is preferably employed with the water soluble silanes or silicones.

In one embodiment of the invention in which the catalyst is employed with silicone water repellents to impart water repellency to paper the catalyst is dissolved in a relatively large volume of diluting water and then added to a water insoluble siloxane such as ethyl polysiloxane which has been emulsified. Such polysiloxanes are partially condensed siloxanes which may range in average molecular weight from 1500 to 14,000 or more and which contain some hydroxyl and alkoxy groups. The concentration of zirconium in the form of zirconium oxychloride in the water added to the emulsion is preferably from 0.0005 percent to 0.02 percent by weight and the volume of water solution added to the emulsion can be from 130 to 2 times the volume of the emulsion. The final mixture of the emulsion and solution of catalyst is so calculated as to give a final concentration of resin solids in the form of ethyl polysiloxane of from 0.1 percent to 5 percent by weight. The catalyst concentration, calculated as zirconium is from 0.05 to 2 percent by weight based on the contained resin solids in the mixture. (By "contained resin solids" we mean the silicone resin in the emulsion.)

Higher concentrations of the catalyst in the water solutions added to the emulsion than those above-indicated lead to gelation of the mixture and the life of the mixture is too short to be of use. However, when the catalyst is added in the concentrations indicated and in the volume of water indicated the mixture has a useful lifetime of several days. For optimum results the catalyst should be added to the emulsion just before use.

Example I, following, illustrates this embodiment of the invention.

EXAMPLE I

The following materials were used to prepare an emulsion:

2.5 parts oleic acid
45 parts of 33 weight percent solution of ethyl polysiloxane in mineral spirits
4.5 parts of triethanolamine
60 parts of water The stirring was accomplished with a high speed stirrer. The oleic acid and resin solution were blended together. The triethanolamine was dissolved in the water and added to the solution with rapid stirring. After the addition of about one-fourth of the water solution a thick paste formed and then became thinner as more water was added.

To the emulsion thus prepared were added 1373 grams of a water solution containing 0.52 gram zirconium oxychloride in the form of the octahydrate ($ZrOCl_2 \cdot 8H_2O$) equivalent to 1 percent zirconium based on the weight of the resin solids contained in the emulsion, the resin solids being 1 percent of the weight of the final emulsion. The freshly catalyzed emulsion was applied to kraft paper by dipping and the paper was air dried for 24 hours. The treated paper exhibited excellent water repellency as shown by the high contact angle of the water and the fact that the paper was not wetted when water was poured on it.

In a preferred embodiment of this invention the zirconium oxychloride is employed with water soluble silicone water repellents such as methyl tris(2-methoxyethoxy) silane, ethyl tris(2-methoxyethoxy) silane and amyl tris(2-methoxyethoxy) silane.

In its most general aspect this method of our invention for curing water soluble silicone water repellents comprises forming a water solution of a water soluble silicone water repellent and a water soluble form of zirconium oxychloride, preferably zirconium oxychloride octahydrate.

The new compositions of our invention, broadly speaking, comprise water solutions of water soluble silicone water repellents and a water soluble form of zirconium oxychloride. Additionally contemplated new compositions within the scope of our invention are comprised of a mixture of a water soluble silicone water repellent and from 0.1 to 10, preferably from 0.5 to 5 percent by weight of the contained resin solids in the water soluble silicone water repellent of zirconium in the form of zirconium oxychloride. Such compositions are stable and provide a convenient method of storing and transporting the silicone water repellent and catalyst in the requisite proportions and need only the addition of water to provide a catalyzed water repellent ready for use.

Other compositions within the scope of the present invention are the water solutions of water soluble silicone water repellents. Preferably, the lower alkyl tris(2-methoxyethoxy) silanes and the lower alkyl tris[2-(β-methoxyethoxy)ethoxy] silanes (by lower alkyl we mean alkyl radicals of from 1 to about 5 carbon atoms) are employed in the water solutions. Especially preferred compositions are found in the water solutions of methyl tris(2-methoxyethoxy) silane, ethyl tris(2-methoxyethoxy) silane and amyl tris(2-methoxyethoxy) silane, containing from 1 to 10 percent, preferably from 3 to 4 percent of resin solids and from 0.1 to 10 percent, preferably from 0.5 to 5 percent by weight of the contained resin solids in the silicone water repellent of zirconium in the form of zirconium oxychloride octahydrate.

A preferred embodiment of the method of our invention for curing water soluble silicone water repellents comprises forming a water solution of a water soluble silicone water repellent, preferably of methyl tris(2-methoxyethoxy) silane, ethyl tris(2-methoxyethoxy) silane or amyl tris(2-methoxyethoxy) silane, containing from 1 to 10 percent, preferably from 3 to 4 percent by weight of resin solids and from 0.1 to 10 percent, preferably from 0.5 to 5 percent, of the weight of the resin solids of zirconium in the form of zirconium oxychloride octahydrate. It will now be evident that mixtures of the above-named water soluble silicone water repellents can also be employed.

Such solutions may be made by adding a solution of the water repellent in water to a water solution of the zirconium oxychloride octahydrate, dissolving the zirconium oxychloride octahydrate in a water solution of the silicone water repellent, or by forming a mixture of the water repellent and zirconium oxychloride octahydrate and dissolving the mixture in water.

Zirconium oxychloride octahydrate is not soluble in water soluble silicone water repellents. However, it forms a stable mixture and when the mixture is later diluted with water for application as a water repellent the zirconium oxychloride octahydrate passes into solution.

The following examples are illustrative of the use of water soluble zirconium oxychloride as a curing catalyst for water soluble silicone water repellents.

EXAMPLE II

Four hundred grams of a treating solution was prepared as follows:

To 42 grams of ethyl tris(2-methoxyethoxy) silane placed in a 600 ml. beaker were added 358 grams of tap water. The resultant solution contained 10.5 percent by weight of the silane corresponding to a 3 percent solution by weight of contained resin solids in the silane (the contained resin solids are the solids resulting on hydrolyzing and fully condensing the silane).

To this solution 0.4 gram of zirconium oxychloride octahydrate was then added. This corresponds to 1 percent zirconium based on the weight of the contained resin solids in the ethyl tris(2-methoxyethoxy) silane.

The following calculations show the method used in arriving at the percentage of zirconium in the final solution:

42 grams of $C_2H_5Si(OC_2H_4OCH_3)_3 =$
12 grams of $[C_2H_5SiO_{3/2}]_x$ i.e., 42 grams of ethyl tris(2-methoxyethoxy) silane equals 12 grams of the fully condensed resin.

The ratio of the grams of resin to the grams of silane is $$\frac{[C_2H_5SiO_{3/2}]_x}{C_2H_5Si(OC_2H_4OCH_3)_3} = \frac{81}{282}$$

$$= \frac{0.287 \text{ gm. of resin}}{1 \text{ gm. of silane}}$$

For 1 percent zirconium based on the contained resin solids in the silane 0.12 gram of zirconium is required.

The ratio of the weight of zirconium to the weight of zirconium oxychloride octahydrate is 91.2/322.3 or 0.283 gram of zirconium per gram of zirconium oxychloride octahydrate. Thus, for 1 percent zirconium in the form of zirconium oxychloride octahydrate and based on the contained resin solids, 0.12/0.283 gram of zirconium oxychloride octahydrate is required, i.e., 0.4 gram of $ZrOCl_2 \cdot 8H_2O$.

The solution prepared as previously described was allowed to stand at room temperature for one-half hour and then was applied to 2½"x2½"x¾" dry mortar blocks made from "Sakrete" (a widely known commercially available dry mix for preparing mortar) by totally immersing the blocks in the catalyzed water solution of the silicone water repellent. The results of this treatment are presented in Table I, below:

Table I. — *Water repellency imparted by ethyl tris(2-methoxyethoxy)silane*

| | "Sakrete" Mortar Relative Percent Water Pickup | | | Treatment Penetration, Min. | Limestone Relative Percent Water Pickup | | |
|---|---|---|---|---|---|---|---|
| | 1 hr. | 4 hr. | 24 hr. | | 1 hr. | 4 hr. | 24 hr. |
| Untreated | [1]100 | 100 | 100 | | | | |
| Silane+no catalyst | 8.2 | 11.1 | 26.5 | 2.5 | [2]100 | 100 | 100 |
| Silane+zirconium oxychloride | 6.6 | 9.0 | 15.8 | 3.0 | 47 | 76 | 81 |

The above tests are total immersion in water, after allowing the treated blocks to air dry for 4 days.
[1] An untreated block pickup is 10% by weight of water, and this is assumed to be 100%.
[2] Values on limestone are based on percent water pickup of a block treated with uncatalyzed silane ester. Here 5 weight-percent pickup is considered as 100%.

EXAMPLE III

"Alabama Limestone" and "Crab Orchard Stone" blocks were immersed in a water solution of methyl tris(2-methoxyethoxy) silane, the concentration of the silane being equivalent to 3 percent resin content; the solution contained 0.03 percent zirconium in the form of zirconium oxychloride (1 percent catalyst based on resin content). The blocks were then air dried. After drying the water repellent the blocks were immersed in water and air dried; this immersing and drying was done 6 times. After this the blocks were put through 200 cycles consisting of 3 minutes of water spray and 17 minutes drying; the blocks were then subjected to 6 freeze-thaw cycles. The blocks were then air dried, immersed in water for one hour, air dried for one hour and weighed. This was followed by immersing the blocks in water for 72 hours, followed by one hour's air drying, and weighing. The results of the immersion tests relative to untreated blocks is found in Table II, below. Column 3 in Table II gives the actual percent water pick-up of the blocks after 1 hour's immersion and columns 4 and 5 present the percent water pick-up relative to the untreated stone blocks where the percent pick-up of water is taken as 100 percent for the untreated blocks.

Table II.—*Effectiveness of zirconium oxychloride catalyzed water soluble silanes on masonry*

| Masonry | Treating Compound (3% Resin+.03% Catalyst) | Percent Absorption, 1 Hr. | Relative Percent Absorption, 1 Hr. | Relative Percent Absorption, 72 Hrs. |
|---|---|---|---|---|
| Alabama Limestone. | Methyl tris(2-methoxyethoxy) silane+Zirconium Oxychloride. | 0.1 | 2 | 13 |
| | None | 4.6 | 100 | 100 |
| Crab Orchard Stone. | Methyl tris(2-methoxyethoxy) silane+zirconium oxychloride. | 0.13 | 15 | 89 |
| | None | 0.89 | 100 | 100 |

EXAMPLE IV

Zirconium oxychloride in the amount of 0.5 weight percent was added to a 15 weight percent aqueous solution of methyl tris(2-methoxyethoxy) silane (equivalent to 3 percent resin solids). The zirconium oxychloride catalyzed solution was applied to white viscose-acetate gaberdine. After six launderings the water repellent was still effective as indicated by a "spray rating" of 70. (A "spray rating" of 90–100 is extremely good, less than 50, bad).

By contrast uncatalyzed water solutions of methyl tris(2-methoxyethoxy) silane applied to white viscose acetate rayon gaberdine gave very poor water repellency.

What is claimed:

1. A method for rendering a material water repellent which comprises admixing a water soluble form of zirconium oxychloride with a water solution of water soluble substituted silanes of general formula:

wherein, R is an alkyl radical containing from 1 to 5 carbon atoms; R' is a radical selected from the group which consists of methyl and ethyl; n has a value of 1 to 2; and each [—(OC$_2$H$_4$)$_n$—OR'] radical attached to the silicon atom may be the same or different, so as to form a water solution of said silanes and zirconium oxychloride, said solution having a concentration of zirconium in solution of from 0.015 to 3.8 percent of the weight of said silanes, and applying said solution to the material to be treated to deposit thereon a water repellent curable at room temperatures.

2. A method for rendering a material water repellent which comprises admixing zirconium oxychloride octahydrate with a water solution of water soluble substituted silanes of general formula:

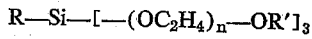

wherein, R is an alkyl radical containing from 1 to 5 carbon atoms; R' is a radical selected from the group which consists of methyl and ethyl; n has a value of 1 to 2; and each [—(OC$_2$H$_4$)$_n$—OR'] radical attached to the silicon atom may be the same or different, so as to form a water solution of said silanes and zirconium oxychloride, said solution having a concentration of zirconium in the solution of from 0.015 to 3.8 percent of the weight of said silanes, and applying said solution to the material to be treated to deposit thereon a water repellent curable at room temperatures.

3. A method for rendering a material water repellent which comprises admixing zirconium oxychloride octahydrate with a water solution of lower alkyl tris(2-methoxyethoxy) silanes wherein the alkyl radicals contain from 1 to 5 carbon atoms, so as to form a water solution of said silanes and zirconium oxychloride, said solution having a concentration of zirconium in the solution of from 0.025 to 3.8 percent of the weight of said silanes, and applying said solution to the material to be treated to deposit thereon a water repellent curable at room temperatures.

4. A method for rendering a material water repellent which comprises admixing a water solution of zirconium oxychloride with lower alkyl tris(2-methoxyethoxy) silanes wherein the alkyl radicals contain from 1 to 5 carbon atoms, so as to form a water solution of said silanes and zirconium oxychloride, said solution having a concentration of zirconium in the final solution of from 0.025 to 3.8 percent of the weight of said silanes, and applying said solution to the material to be treated to deposit thereon a water repellent curable at room temperatures.

5. A method for rendering a material water repellent which comprises admixing lower alkyl tris(2-methoxyethoxy) silanes wherein the alkyl radicals contain from 1 to 5 carbon atoms, water soluble zirconium oxychloride and water to form a water solution of said silanes and zirconium oxychloride, said solution having a concentration of zirconium in the solution of from 0.025 to 3.8 percent of the weight of said silanes, and a concentration of silanes of from 2.63 to 40.0 percent by weight of said solution, and applying said solution to the material to be treated to deposit thereon a water repellent curable at room temperatures.

6. A method for rendering a material water repellent which comprises admixing lower alkyl tris(2-methoxyethoxy) silanes wherein the alkyl radicals contain from 1 to 5 carbon atoms, zirconium oxychloride octahydrate and water to form a water solution of said silanes and zirconium oxychloride, said solution having a concentration of zirconium in the solution of from 0.125 to 1.9 percent of the weight of said silanes, and a concentration of silanes of from 7.89 to 16.0 percent by weight of said solution, and applying said solution to the material to be treated to deposit thereon a water repellent curable at room temperatures.

7. A method for rendering a material water repellent which comprises admixing methyl tris(2-methoxyethoxy) silane, zirconium oxychloride octahydrate and water to form a water solution of said silane and zirconium oxychloride said solution having a concentration of zirconium in the solution of from 0.125 to 1.25 percent of the weight of said silane, and a concentration of silane of from 11.99 to 16.0 percent by weight of said solution, and applying said solution to the material to be treated to deposit thereon a water repellent curable at room temperatures.

8. A method for rendering a material water repellent which comprises admixing ethyl tris(2-methoxyethoxy) silane, zirconium oxychloride octahydrate and water to form a water solution of said silane and zirconium oxychloride, said solution having a cencentration of zirconium in the solution of from 0.143 to 1.44 percent of the weight of said silane, and a concentration of silane of from 10.44 to 14.0 percent by weight of said solution, and applying said solution to the material to be treated to deposit thereon a water repellent curable at room temperatures.

9. A method for rendering a material water repellent which comprises admixing amyl tris(2-methoxyethoxy) silane, zirconium oxychloride octahydrate and water to form a water solution of said silane and zirconium oxychloride, said solution having a concentration of zirconium in the solution of from 0.189 to 1.9 percent of the weight of said silane, and a concentration of silane of from 7.89 to 10.53 percent by weight of said solution, and applying said solution to the material to be treated to deposit thereon a water repellent curable at room temperatures.

10. As a new composition, a mixture comprising water-soluble substituted silanes of general formula:

wherein, R is an alkyl radical containing from 1 to 5 carbon atoms; R' is a radical selected from the group which consists of methyl and ethyl; n has a value of 1 to 2; and each [—(OC$_2$H$_4$)$_n$—OR'] radical attached to the silicon atom may be the same or different, and from 0.075 to 1.9 percent of the weight of said silanes of zirconium in the form of zirconium oxychloride octahydrate.

11. As a new composition, a mixture comprising lower alkyl tris(2-methoxyethoxy) silanes wherein the alkyl radicals contain from 1 to 5 carbon atoms, and zirconium, said zirconium being in a concentration of from 0.125 to 1.9 percent by weight of said silanes and being in the form of zirconium oxychloride octahydrate.

12. As a new composition, a mixture comprising methyl tris(2-methoxyethoxy) silane and zirconium, said zirconium being in a concentration of from 0.125 to 1.25 percent by weight of said silane and being in the form of zirconium oxychloride octahydrate.

13. As a new composition, a mixture comprising ethyl tris(2-methoxyethoxy) silane and zirconium, said zirconium being in a concentration of from 0.143 to 1.43 percent by weight of said silane and being in the form of zirconium oxychloride octahydrate.

14. As a new composition, a mixture comprising amyl tris(2-methoxyethoxy) silane and zirconium, said zirconium being in a concentration of from 0.189 to 1.9 percent by weight of said silane and being in the form of zirconium oxychloride octahydrate.

15. As a new composition, a water solution comprised of water-soluble substituted silanes of general formula:

$$R-Si-[-(OC_2H_4)_n-OR']_3$$

wherein, R is an alkyl radical containing from 1 to 5 carbon atoms; R' is a radical selected from the group which consists of methyl and ethyl; n has a value of 1 to 2; and each [—(OC$_2$H$_4$)$_n$—OR'] radical attached to the silicon atom may be the same or different, and from 0.075 to 1.9 percent of the weight of said silanes of zirconium in the form of zirconium oxychloride.

16. As a new composition, a water solution of lower alkyl tris(2-methoxyethyl) silanes wherein the alkyl radicals contain from 1 to 5 carbon atoms, containing in solution from 0.025 to 3.8 percent zirconium based on the weight of said silanes, said zirconium being in solution as zirconium oxychloride.

17. As a new composition, a water solution comprised of lower alkyl tris(2-methoxyethoxy) silanes wherein the alkyl radicals contain from 1 to 5 carbon atoms, and zirconium oxychloride octahydrate, said zirconium oxychloride octahydrate being present in an amount sufficient to provide a concentration of zirconium in the solution of from 0.025 to 3.8 percent of the weight of said silanes, and said silanes being present in an amount sufficient to give a concentration of silanes of from 2.63 to 40.0 percent by weight of said solution.

18. As a new composition, a water solution comprised of lower alkyl tris(2-methoxyethoxy) silanes wherein the alkyl radicals contain from 1 to 5 carbon atoms, and zirconium oxychloride octahydrate, said zirconium oxychloride octahydrate being present in an amount sufficient to provide a concentration of zirconium in the solution of from 0.125 to 1.9 percent of the weight of said silanes, and said silanes being present in an amount sufficient to give a concentration of silanes of from 7.89 to 16.0 percent by weight of said solution.

19. As a new composition, a water solution comprised of methyl tris(2-methoxyethoxy) silane and zirconium oxychloride octahydrate, said zirconium oxychloride octahydrate being present in an amount sufficient to provide a concentration of zirconium in the solution of from 0.125 to 1.25 percent of the weight of said silane, and said silane being present in an amount sufficient to give a concentration of silane of from 11.99 to 16.0 percent by weight of said solution.

20. As a new composition, a water solution comprised of ethyl tris(2-methoxyethoxy) silane and zirconium oxychloride octahydrate, said zirconium oxychloride octahydrate being present in an amount sufficient to provide a concentration of zirconium in the solution of from 0.143 to 1.43 percent of the weight of said silane, and said silane being present in an amount sufficient to give a concentration of silane of from 10.44 to 14.0 percent by weight of said solution.

21. As a new composition, a water solution comprised of amyl tris(2-methoxyethoxy) silane and zirconium oxychloride octahydrate, said zirconium oxychloride octahydrate being present in an amount sufficient to provide a concentration of zirconium in the solution of from 0.189 to 1.9 percent of the weight of said silane, and said silane being present in an amount sufficient to give a concentration of silane of from 7.89 to 10.53 percent by weight of said solution.

References Cited in the file of this patent

UNITED STATES PATENTS

| | | |
|---|---|---|
| 2,453,562 | Wright | Nov. 9, 1948 |
| 2,559,342 | Burkhard | July 3, 1951 |
| 2,687,388 | McNulty | Aug. 24, 1954 |
| 2,728,736 | Hunter et al. | Dec. 27, 1955 |
| 2,757,152 | Solomon | July 31, 1956 |
| 2,774,690 | Cockett et al. | Dec. 18, 1956 |
| 2,798,858 | Brown | July 9, 1957 |

UNITED STATES PATENT OFFICE
CERTIFICATION OF CORRECTION

Patent No. 2,957,839                                          October 25, 1960

Gordon C. Johnson et al.

It is hereby certified that error appears in the above numbered patent requiring correction and that the said Letters Patent should read as corrected below.

Column 7, line 17, for "tris(2-methoxyethyl)" read -- tris(2-methoxyethoxy) --.

Signed and sealed this 18th day of July 1961.

(SEAL)
Attest:

ERNEST W. SWIDER                                DAVID L. LADD
Attesting Officer                                   Commissioner of Patents